US005360833A

United States Patent [19]

Eckberg et al.

[11] Patent Number: 5,360,833
[45] Date of Patent: Nov. 1, 1994

[54] CONTROLLED RELEASE COMPOSITIONS FOR UV CURABLE EPOXYSILICONE RELEASE AGENTS

[75] Inventors: Richard P. Eckberg, Saratoga Springs; Robert F. Agars, Clifton Park, both of N.Y.

[73] Assignee: General Electric Company, Waterford, N.Y.

[21] Appl. No.: 981,589

[22] Filed: Nov. 25, 1992

[51] Int. Cl.$^5$ .................. C08F 2/50; C08G 77/14; C08G 59/02
[52] U.S. Cl. ...................... 522/31; 522/170; 522/172; 528/27; 528/33; 528/14
[58] Field of Search .................. 522/170, 172, 31; 528/27, 14, 33

[56] References Cited

U.S. PATENT DOCUMENTS

| | | | |
|---|---|---|---|
| 3,527,659 | 9/1970 | Keil | 117/145 |
| 4,123,604 | 10/1978 | Sandford, Jr. | 528/31 |
| 4,279,717 | 7/1981 | Eckberg et al. | 204/159.13 |
| 4,370,358 | 1/1983 | Kayes et al. | 522/170 |
| 4,952,657 | 8/1990 | Riding et al. | 528/27 |
| 4,977,198 | 12/1990 | Eckberg | 522/25 |
| 4,994,299 | 2/1991 | Stein et al. | 522/170 |
| 5,188,991 | 10/1992 | Riding | 522/172 |
| 5,198,476 | 3/1993 | Kobayashi et al. | 522/170 |

*Primary Examiner*—Susan W. Berman

[57] ABSTRACT

A UV curable epoxysilicone blend of an epoxy functional silicone resin containing Q groups, epoxy functional M groups, and at least one member selected from D groups and T groups, at least 5 parts of the sum of M groups and epoxy functional M groups per 10 parts of the sum of Q groups, D groups and T groups; and an epoxy-stopped silicone fluid containing epoxy functional M groups.

12 Claims, No Drawings

CONTROLLED RELEASE COMPOSITIONS FOR UV CURABLE EPOXYSILICONE RELEASE AGENTS

BACKGROUND OF THE INVENTION

Curable silicone coatings for release of pressure-sensitive adhesives (PSA) are known. These coatings may be cured via tin-catalyzed condensation reactions, platinum-catalyzed addition reactions, or radiation-initiated crosslinking reactions.

Linear polydimethyl siloxanes form what are referred to as premium or low release coatings. When crosslinked, these materials form adhesive surfaces from which a PSA-laminated facestock may be detached with very little force required. Such premium release characteristic is desirable for many applications.

There are, however, significant applications for silicone release coatings which do not provide easy release from PSA's. Such coatings which provide a tight or controlled release characteristic are desirable, for example, in industrial labeling operations which run at high speed. A high release silicone agent is desirable in order to prevent so-called premature dispensing of the label from the release liner. A controlled release characteristic is useful for two-sided release laminate applications wherein one side of the laminate is coated with a premium release silicone and the other side is coated with a tight release silicone, thus providing a differential release structure.

Ideally, silicone release systems that have a range of release characteristics are desirable. Such silicone coating systems would enable an end-user to selectively adjust the formulation to give the desired level of release depending on the specific application. A tight release polymer capable of giving a range of release levels in a blend with premium release polymer is referred to as a controlled release additive (CRA).

Despite the intensity of effort in this area, commercial products designed to be controlled release (tight release) additives (CRAs) for ultraviolet radiation curable epoxysilicone release systems have not been generally successful because they often do not cure as readily as the premium release epoxysilicones; they do not provide large release differential vs. the premium release materials except at very high concentrations in coating baths (>70%); and cured films containing these CRAs often lose their high release characteristics as they age after cure. Promising experimental UV-curable CRAs have also not been as efficient as desired, and in many cases have caused undesirable 'zippy' (jerky, uneven) type release which is unacceptable in the market.

Exemplary UV-CRA products provide tight release (relative to the premium release epoxysilicone polymers taught in U.S. Pat. No. 4,279,717 and other patents) by incorporation of highly polar hydroxybenzoate ester groups (U.S. Pat. No. 4,977,198) or phenol groups (U.S. Pat. No. 4,952,657) along with reactive epoxy groups into the polydimethylsiloxane polymers. In each case, products so designed are not successful for reasons noted above.

UV-CRAs incorporating reactive, epoxy-functional 'Q' type silicone resins plus linear (nonresinous) epoxysilicone polymers analogous to traditional thermally cured silicone CRAs (solvent-borne and solventless) which make use of silicone resins as taught in U.S. Pat. Nos. 4,123,604, 3,527,659 and 5,158,911 and in U.S. patent application Ser. No. 07/923,112, filed Jul. 30, 1992, in the name of Eckberg and Griswold. In U.S. Pat. No. 5,158,911, the epoxy-MQ resins taught therein are high viscosity (or solid) materials incompatible with low viscosity epoxysilicone carriers without solvent vehicle. Eckberg and Griswold, which teaches 'bound'M' TQ resin/epoxysilicone fluid compositions, is limited in effectiveness because solventless silicone coating constrains coating bath viscosities to be <1000 cstk, which in turn limits the actual resin content of the CRA<35 wt %. High release of these materials is a function of actual epoxysilicone resin concentration. Thus, the efficiency of the compositions is limited.

SUMMARY OF THE INVENTION

The present invention is based upon the discovery that certain unique combinations of epoxy-functional silicone resins plus epoxy-terminated dimethylsilicone fluids overcome the performance deficiencies associated with the UV cure epoxysilicone CRAs noted above. Improved CRA performance lies in careful matching of epoxy content of the resin with that of the epoxy-stopped fluid, plus formulating epoxysilicone resins including D groups with TQ- or Q-containing resins also including sufficient M (as M and $M^E$) to keep the resin + fluid compositions coatable at 100% silicone solids even when the resin component of the complete CRA exceeds 50 wt %.

In a particular embodiment, the invention is directed to an ultraviolet radiation-curable epoxysilicone composition comprising a blend of epoxy-functional silicone resins and epoxy-stopped silicone fluids curable in the presence of an efficacious amount of 'onium-type cationic photocatalyst and ultraviolet radiation. Exemplary 'onium catalysts include iodonium and sulfonium salts. The blend comprises: (A) from about 20 to about 80% by weight epoxy-functional silicone resin, said resin containing Q groups, epoxy-functional M groups and at least one member selected from D groups and T groups, there being at least 5 parts of the sum of M groups and epoxy-functional M groups per 10 parts of the sum of Q groups, D groups and T groups; and (B) about 80 to about 20% by weight epoxy-stopped silicone fluids containing epoxy-functional M groups; the blend (A) and (B) having an epoxy equivalent weight of greater than 1000.

In the epoxysilicone composition an effective epoxy-functional M group is

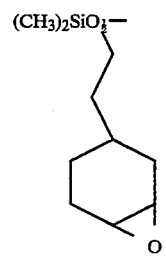

DESCRIPTION OF THE INVENTION

The present invention is directed to an ultraviolet radiation-curable epoxysilicone composition which is a blend of epoxy-functional silicone resins and epoxy-stopped silicone fluids which may be cured to an adhesive coating in the presence of an efficacious amount of photocatalyst and ultraviolet radiation. The blend generally comprises (A) from about 80 to about 20% by weight epoxy-functional silicone resin, said resin containing Q groups, epoxy-functional M groups and at least one member selected from D groups and T groups, at least 5 parts of the sum of M groups and epoxy-functional M groups per 10 parts of the sum of Q groups, D groups and T groups, and (B) about 20 to about 80% by weight epoxy-stopped silicone fluids containing epoxy-functional M groups, said blend having an epoxy equivalent weight of greater than 1000.

In the epoxysilicone composition an effective epoxy-functional M group is

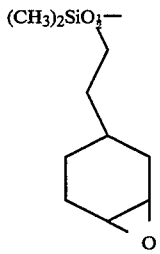

In a particular embodiment, the ultraviolet radiation-curable epoxysilicone composition comprises a blend of epoxy-functional silicone resins and epoxy-stopped silicone fluids curable a weight percent ratio of 60:40. The composition is curable in the presence of an efficacious amount of photocatalyst and ultraviolet radiation.

For purposes of this disclosure, the following abbreviations will be employed:

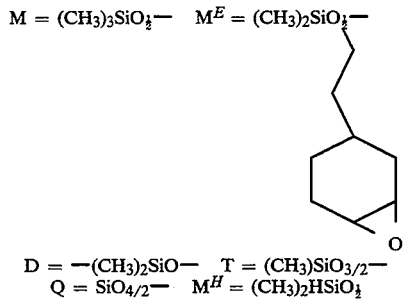

$D = -(CH_3)_2SiO-$  $T = (CH_3)SiO_{3/2}-$
$Q = SiO_{4/2}-$  $M^H = (CH_3)_2HSiO_{\frac{1}{2}}$ Other aliphatic or aromatic radicals having 2 to about 10 carbon atoms may be substituted for $(CH_3)$.

The following are the general procedures for making the SiH-functional resin and fluid UV-CRA precursors.

SiH-Stopped Resin Solution

A xylene solution of the following silanes was prepared: 1.0 part dimethylchlorosilane, 9.4 parts trimethylchlorosilane, 4.2 parts dimethyldichlorosilane, 2.9 parts trimethoxymethylsilane, and 11.3 parts tetraethylorthosilicate $(EtO)_4Si$. The mole ratio of these silanes were approximately 1:8:3:5:2:5 $M^HM:D:T:Q$. This solution was slowly added to 40 parts water at 10°–30° C. over a 60 minute period, then agitated for two more hours at 40° C. The organic phase was separated from the aqueous phase, the aqueous phase discarded, the organic phase then refluxed at 130°–140° C. using a Deanstark apparatus to remove water, then finally raising the reflux temperature to 160° C. at which point the resin was bodied and the solids content was 60%. Analysis of the resin solution indicated @700 ppm H (as reactive $M^H$), with $Si^{29}$ analysis confirming the resin formula to be @$M^HM_8D_3T_2Q_5$. Other resins to be described in the disclosure were made in this fashion. We found that removal of all xylene solvent from this solution resulted in isolation of a solid, water-white silicone which softened and readily flowed when warmed above 70° C. Isolation of the SiH resins was not necessary, however, and their xylene solutions were used to make the final UV-CRA compositions.

SiH-Stopped Silicone Fluid

This material was prepared via standard acid-catalyzed equilibration of octamethylcyclotetrasiloxane, $D_4$, with 1,1,3,3-tetramethyldisiloxane, $M^HM^H$. Sulfuric acid/carbon black catalyst (0.1% acid) was used to equilibrate 163 grams $D_4$ with 14 grams $M^HM^H$. The final product was a 20 cstk viscosity fluid, 859 ppm H (as SiH) per gaseometric analysis, including 17% volatiles. The approximate formula, based on the SiH analysis, was $M^HD_{29}M^H$. Other SiH-stopped (dimethylsilyl-stopped) linear polydimethylsiloxanes to be mentioned in this disclosure were made and characterized in the same fashion.

UV-Curable Epoxysilicone CRA Compositions

EXAMPLE 1

100 parts of the SiH resin solution (@60 parts of resin solids) plus 40 parts of the SiH-stopped silicone fluid were mixed together with 0.01 part methyldicocoamine stabilizer and sufficient $RhCl_3(Bu_2S)_3$ catalyst (as an 11% solution in ethanol) to provide @3 ppm rhodium to the reaction mixture. 14 grams 4-vinylcyclohexeneoxide (VCHO) were added, the reaction mixture then brought to 110° C. An exothermic response occurred which raised batch temperature to 140° C. SiH was undetectable after 2 hours' hold at 120°. Stripping off xylene, excess VCHO, and siloxane light ends in vacuo afforded a clear fluid product, 450 cstk viscosity and 96% solids, which included about 60 wt % epoxy-functional resin $M^EM_8D_3T_2Q_5$ plus 40 wt % epoxy-stopped fluid $M^ED_{29}M^E$. Various materials listed below in Table 1A were made in this same fashion. An amine/rhodium catalyzed addition of VCHO to the mixture of SiH-functional silicones as taught by Eckberg and Agars, U.S. Pat. No. 5,240,971 (incorporated herein by reference) was employed.

Several complete UV-CRA candidate materials were produced using different SiH resin and SiH-stopped fluid inputs. In all cases VCHO addition proceeded smoothly and the resulting products were readily isolated and characterized. The results are tabulated below:

TABLE 1A

| EXAMPLE | RESIN | FLUID | RESIN/FLUID |
|---|---|---|---|
| 1 | $M^3{}_EM_6T_5Q_5$ | $M^ED_{10}M^E$ | 60/40 |
| 2 | $M^E{}_{1.5}M_3T_5Q_5$ | $M^ED_{10}M^E$ | 60/40 |
| 3 | $M^E{}_3M_6T_5Q_5$ | $M^ED_{10}M^E$ | 70/30 |
| 4 | $M^E{}_3M_6T_5Q_5$ | $M^ED_{50}M^E$ | 60/40 |
| 5 | $M^E{}_2M_7T_5Q_5$ | $M^ED_{50}M^E$ | 70/30 |
| 6 | $M^EM_8T_5Q_5$ | $M^ED_{22}M^E$ | 60/40 |
| 7 | $M^EM_8T_4Q_6$ | $M^ED_{54}M^E$ | 60/40 |
| 8 | $M^EM_8D_5Q_5$ | $M^ED_{29}M^E$ | 60/40 |
| 9 | $M^EM_8D_3T_2Q_5$ | $M^ED_{29}M^E$ | 60/40 |
| 10 | $M^EM_8D_2T_3Q_5$ | $M^ED_{29}M^E$ | 60/40 |
| 11 | $M^EM_8DT_4Q_5$ | $M^ED_{29}M^E$ | 60/40 |

TABLE 1B

| EXAMPLE* | APPEARANCE | VISCOSITY | E.E.W.** |
|---|---|---|---|
| 1 | Clear Fluid | 373 cstk | 600 |

TABLE 1B-continued

| EXAMPLE* | APPEARANCE | VISCOSITY | E.E.W.** |
|---|---|---|---|
| 2 | Clear Fluid | 16400 | 680 |
| 3 | Clear Fluid | 972 | 600 |
| 4 | Hazy-two phases resin settled out | | |
| 5 | Hazy-resin phase separated out | | |
| 6 | Clear Fluid | 1024 | 990 |
| 7 | Hazy - resin phase separated out | | |
| 8 | Clear Fluid | 250 | 1100 |
| 9 | Clear Fluid | 450 | 1100 |
| 10 | Clear Fluid | 635 | 1100 |
| 11 | Clear Fluid | 500 | 1100 |

*All samples cited above were >96% solids per 150° C., 45 min. weight loss testing
**Calculated Epoxy Equivalent Weight It appears that coatable epoxysilicone resin/fluid mixtures (neat viscosity<1000 cstk) with resin content>50% require that total 'M' in the resin be at least 50 mole percent of total ('D'+'T'+'Q'), preferably 75–100 mole percent. It is also important that the epoxy content of the epoxysilicone resin be comparable to, or less than the epoxy content of the epoxy-stopped silicone fluid component of the CRA composition or else the two parts of the CRA are immiscible and will not form a stable clear blend.

Several examples from the initial CRA formulations in Examples 1–11 above were selected which met convenient criteria for stability and coatable viscosity. These were prepared for assessment as 0.5 mil coatings on Polyethylene Kraft (PEK) liner stock when blended neat with 1 wt % iodonium catalyst $(C_{12}H_{25}Ph)_2ISbF_6$ in 2 ethyl 1,3 hexane diol, 50% active ingredients. An RPC Model QC1202 Lab UV Processor equipped with two medium pressure mercury vapor ultraviolet lamps was used.

TABLE 2

| Example | Apearance | UV Flux for Cure*, mJ/cm$^2$ |
|---|---|---|
| 1 | clear mix | 20 |
| 3 | clear mix | 40 |
| 6 | slightly hazy, stable | 40 |
| 8 | hazy, but no separation | 42 |
| 9 | hazy mixture, stable | 45 |
| 10 | hazy mixture, stable | 50 |
| 11 | hazy mixture, stable | 45 |
| 12** | clear mix | 20 |
| 13*** | clear mix | 68 |

*'cure' defined as smear- and migration-free (vs 3M Scotch 610 tape) silicone coating.
**control, easy release epoxysilicone, i.e., linear epoxy functional silicone fluid having an EEW of about 900 and a nominal viscosity of about 300 cstk at 25° C.
***control, tight release epoxysilicone, i.e., linear polymer containing substantially equal amounts of epoxy functional groups and phenol functional groups, and the balance being dimethyl siloxane functional groups, having an EEW of about 1500 and a nominal viscosity of about 300 cstk at 25° C.

UV-CRA formulations with highest epoxy content were most compatible with the iodonium catalyst and generally gave the most efficient cure (lowest UV flux needed for cure). Even where the catalyst was not completely miscible, coating baths tested showed no sign of physical separation of photocatalyst for several days after being blended. UV cure response of all these compositions was judged to be adequate, and in all cases was superior to that of the neat tight release polymer Example 13.

The selected materials were assessed as tight release additives in Example 12. Baths consisting of 75 parts of various high release candidates+25 parts of Example 12 low release polymer were prepared, then mixed with 1 part of the iodonium photocatalyst, coated to @0.8 g/m$^2$ weight on PEK using a lab solventless coating device, and cured to migration-free coatings by exposure to @100 mJ/cm$^2$ UV flux in the RPC Processor. A control bath consisting of Example 12 alone was similarly catalyzed, coated, and cured. Tesa test tape #4190 (an acrylic adhesive tape) was affixed to the silicone surface, and the taped release liners aged at 70° for 20 hours. The force required to peel away the Tesa tape from the silicone surface at 180°<, 50 inch/min. peel was determined as gram/inch (Tesa tape is 1 inch wide). The results of this experiment are given below:

TABLE 3

| EXAMPLE | RESIN FORMULA | RELEASE | REMARKS |
|---|---|---|---|
| 1 | 60% $M^E_3M_6T_5Q_5$ | 75–95 g/in. | zippy |
| 3 | 70% $M^E_3M_6T_5Q_5$ | 110–130 | very zippy |
| 6 | 60% $M^EM_8T_5Q_5$ | 115–>250 | very zippy |
| 8 | 60% $M^EM_8D_5Q_5$ | 110–140 | smooth release |
| 9 | 60% $M^EM_8D_3T_2Q_5$ | 150–215 | smooth release |
| 10 | 60% $M^EM_8D_2T_3Q_5$ | 180–240 | smooth release |
| 11 | 60% $M^EM_8DT_4Q_5$ | 250–300 | sl. zippy release |
| 12 | (none) | 25–30 | smooth release |

'Zippy' release, as defined previously, is considered undesirable for silicone release coatings, although MQ resin containing addition- and condensation-cure CRAs often display 'zippy' release at high CRA loads. Examples 1 and 9 were prepared in sufficient quantities to be run on an 18' wide 3 roll offset gravure 18 inch pilot coater equipped with two banks of Fusion Systems' microwave fired 'H' UV lamps capable of operation at 400 and 600 watts/inch nominal power. Initial experiments were carried out with the UV-CRA candidate Example 1 blended at various levels with the low or premium release epoxysilicone polymer Example 12 plus 1 wt % of the iodonium photocatalyst. These mixtures were coated on PEK substrate at a coat weight of @1.2 g/m$^2$, at a speed of 400 fpm, then exposed to the two banks of lamps set at 600 watts/in power. All coatings were cured to smear- and migration-free silicone surfaces immediately off line, with no evidence of post cure. Samples of the cured silicone liners so produced were maintained at room temperature for 6 days, then laminated with Monsanto Gelva 263 solvent-borne acrylic PSA, with a normal paper face stock applied to the adhesive. 2 inch wide tapes of these constructions were prepared, and the release force needed to pull the silicone/PEK lamina from the facestock/PSA lamina at 400 inch/min. pull speed and 180°< determined periodically over a 4 week period. Release results are tabulated below:

TABLE 4

| Formulation % Ex. 1 in Ex. 12 | INITIAL | 4 WK RELEASE | REMARKS |
|---|---|---|---|
| 100% | 25–60 g/2in | 40–70 g/2in | very zippy |

TABLE 4-continued

| Formulation % Ex. 1 in Ex. 12 | INITIAL | 4 WK RELEASE | REMARKS |
|---|---|---|---|
| 90% | 25–50 | 35–65 | very zippy |
| 80% | 30–60 | 35–60 | very zippy |
| 70% | 30–60 | 35–55 | very zippy |
| 50% | 25–45 | 30–50 | slightly zippy |
| 0% | 25–30 | 25–30 | smooth release |

The performance of the material of Example 1 proved to be unsatisfactory. Although the material coated and cured well, it provided only a small release differential vs the unmodified Example 12 or control baths, and also imparted an undesirable 'zippy' character to the release. This combination of poor CRA performance characteristics may result from the high epoxy content of the CRA composition. Eckberg (Radtech '88 North America Conference Proceedings, New Orleans, 1988) has shown that epoxy equivalent weight <800 causes erratic, 'zippy' release in linear epoxysilicone release coatings. The results herein appear to reinforce this observation and extend the experiments to non-linear epoxysilicone resin/fluid compositions.

Example 9 materials were coated with premium release Example 12 on several different substrates using the offset gravure pilot coater referred to above. Coating baths consisting of Examples 9 and 12 blends with varying levels of Example 9 CRA, with a 1% load of the iodonium photocatalyst were made. Materials were coated on PEK at 400 fpm line speed, 1.2 g/m² coat weight as above, then laminated with the same Gelva 263 acrylic adhesive. Release results are noted below:

TABLE 5

| Formulation % Ex. 9 in Ex. 12 | Initial Release | 4 Wk Aged Release | Remarks |
|---|---|---|---|
| 100% | 800 g/2in | 850 g/2in | smooth release |
| 90% | 430 | 600 | smooth release |
| 80% | 280 | 330 | smooth release |
| 70% | 165 | 215 | smooth release |
| 60% | 105 | 135 | smooth release |
| 50% | 75 | 110 | smooth release |
| 25% | 55 | 65 | smooth release |
| 0% | 30 | 40 | smooth release |

Although release is slightly unstable over the 4 week period of these measurements, the large differential in release vs the unmodified control material of Example 12, even at fairly low levels of the CRA, coupled with the fact that even the highest release measured was not 'zippy', ragged or uneven, makes the performance of this material far superior to known epoxysilicone CRAs.

Comparative Example 14

A UV-CRA representative of prior art as taught in Riding, et al., U.S. Pat. No. 4,952,657, approximate formula $MD_{15}D^E{}_2D^P{}_2M$, where $D^E$ is as defined previously, and

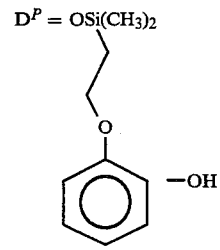

$$D^P = OSi(CH_3)_2$$

Example 14 was blended with Example 12, catalyzed with 1% of the iodonium photocatalyst, then coated and cured on PEK using the same offset gravure pilot coater used for the evaluation of the new candidate UV-CRAs. Laminates with Gelva 263 were then prepared and release determined as described above. Typical results are as follows:

TABLE 6

| Formulation % Ex. 14 in Ex. 12 | Initial Release | 4 Wk Release | Remarks |
|---|---|---|---|
| 90% | 120 grams/2 in | 125 g/2in | smooth release |
| 50% | 55 | 55 | smooth release |
| 0% | 40 | 40 | smooth release |

This experiment demonstrates that the prior art UV cure epoxysilicone CRA of Example 14 does not provide as useful a release differential vs. the unmodified material of Example 12 as the UV CRA of Example 9.

Separate coating experiments with Example 9 UV CRA on the offset gravure pilot coater utilized different substrates and were tested with other adhesives. Some of the formulations coated on PEK were laminated using Ashland 1085 acrylic adhesive instead of the GELVA 263, with these results:

TABLE 7

| FORMULATION % Ex. 9 in Ex. 12 | RELEASE, g/2in |
|---|---|
| 100% 475-1197 | 194 |
| 90% 475-1197 | 175 |
| 60% 475-1197 | 86 |
| 0% (UV9300) | 39 |

EXAMPLE 15

A premium release epoxy-silicone similar to Example 12 but with an EEW of 1100.

The Example 9 CRA was run as blends with Example 15 on high density polyethylene (3% catalyst was present in the coating formulations), 400 ft/min. line speed. The following release was recorded vs Gelva 263 adhesive:

TABLE 8

| Formulation % Ex. 9 in Ex. 15 | Initial Release | 3 wk Release |
|---|---|---|
| 80% | 200 g/2in | 215 g/2in |
| 75% | 115 | 120 |
| 50% | 65 | 65 |
| 37.5% | 45 | 50 |
| 25% | 35 | 40 |
| 12.5% | 35 | 40 |
| 0% | 25 | 30 |

Similar formulations were coated on Kammerer AV100 Glassine paper, at 200 fpm line speed. Release vs Gelva 263 PSA was the following:

TABLE 9

| Formulation % Ex. 9 in Ex. 15 | 1 Wk Aged Release |
|---|---|
| 90% | 825 g/2in |
| 80% | 625 |
| 75% | 470 |
| 67% | 370 |
| 50% | 200 |
| 25% | 100 |
| 0% | 55 |

These release results clearly demonstrate that the UV CRA composition of Example 9 is an efficient, useful UV curable tight release additive well designed for use with premium release epoxysilicone release polymers vs. different adhesives when applied to several different substrates. It is further demonstrated that significant differential release (compared to unmodified premium release baths) can be obtained by use of much less CRA than prior art epoxysilicone tight release additives require.

A sequence of experiments was carried out to determine if the tight release effect obtained with Example 9 (and analogous materials described herein) is stable; that is, if the cured silicone coating retains the high release desired as the cured coating ages. These evaluations were carried out as follows: cured samples of CRA-containing liner were set aside for 4 weeks after being coated, then laminated with Gelva 263 PSA; the laminates were measured for release after 4 weeks' aging, and the release values so obtained were compared with those from laminates prepared 6 days after coating (unlaminated liners were aged at room temperature). These results were obtained for blends of Example 9 and Example 12 formulations on PEK:

TABLE 10

| Formulation | 6 Days Aged Liner | 4 Wks Aged Liner |
|---|---|---|
| 100% | 850 g/2in | 750 g/2in |
| 90% | 610 | 520 |
| 80% | 340 | 350 |
| 70% | 215 | 210 |
| 60% | 135 | 140 |
| 50% | 110 | 95 |
| 25% | 65 | 55 |
| 0% | 40 | 35 |

Although some drop in release was observed after 4 weeks' aging of the unlaminated samples containing high levels of Example 9 CRA, the rest of the samples appeared to exhibit very stable release.

COMPARATIVE EXAMPLE 16

Epoxy/phenol cofunctionalized silicone, approximate formula $MD_{20}D^E_{1.5}D^P_{1.5}M$ representative of known epoxysilicone CRAs (the same material described in comparative Example 14).

Another experiment relating to release stability of the unlaminated liners was carried out. In this case, PEK liners containing a CRA 90/10 blend of Example 9 with Example 15 coating and PEK-coated liners containing 100% of Example 16 were aged in a 70° C. oven for 63 hours, then laminated with the Gelva PSA as before. Release was determined one day after the laminates were prepared.

| 90% Ex. 9 in 10% Ex. 12: | heat aged 650 g/2in | not aged 740 g |
| 100% Ex. 14: | heat aged 90 g/2in | not aged 210 g |

While some drop in release is observed due to thermal aging of the Example 9 containing liner, this loss (@12%) is small compared to the dramatic >50% decrease in release when the known Example 14 epoxy/phenol silicone CRA-coated liner is aged the same way.

The UV curable epoxysilicone compositions of the invention are well-suited for controlled release applications, and are superior to prior art materials for these purposes. These CRAs of the invention are blends of epoxy-functional silicone resins with epoxy-stopped silicone fluids. In particular, good results are obtained with formulations consisting of 60% resin/40% fluid, epoxy equivalents weights > 1000, where the resin includes at least 5 parts of $M^E+M$ per 10 parts (D or T or D+T)+Q.

While there has been described what at present are considered to be the preferred embodiments of the present invention, it will be readily apparent to those skilled in the art that various changes and modifications may be made therein without departing from the invention and it is intended in the appended claims to cover such changes and modifications as fall within the true spirit and scope of the invention.

What is claimed:

1. An ultraviolet radiation-curable epoxysilicone composition comprising a blend of epoxy-functional silicone resins and epoxy-stopped silicone fluids which in the presence of an efficacious amount of 'onium photocatalyst is curable when exposed to ultraviolet radiation, said blend comprising:

(A) about 60% by weight epoxy-functional silicone resin, said resin containing Q groups, epoxy-functional M groups and at least one member selected from D groups and T groups, wherein said resin comprises at least 5 parts of the sum of M groups and epoxy-functional M groups per 10 parts of the sum of Q groups, D groups and T groups;

(B) about 40% by weight epoxy-stopped silicone fluids containing epoxy-functional M groups; and said blend having an epoxy equivalent weight of greater than 1000.

2. An epoxysilicone composition as in claim 1, wherein said epoxy-functional M group is

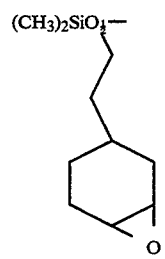

3. An ultraviolet radiation-curable epoxysilicone composition comprising a blend of epoxy-functional silicone resins and epoxy-stopped silicone fluids which in the presence of an efficacious amount of 'onium photocatalyst is curable when exposed to ultraviolet radiation, said blend comprising:

(A) from about 80 to about 20% by weight epoxy-functional silicone resin, said resin containing Q groups, epoxy-functional M groups and at least one member selected from D groups and T groups, wherein said resin comprises at least 5 parts of the sum of M groups and epoxy-functional M groups per 10 parts of the sum of Q groups, D groups and T groups;

(B) about 20 to about 80% by weight epoxy-stopped silicone fluids containing epoxy-functional M groups; and said blend having an epoxy equivalent weight of greater than 1000.

4. An epoxysilicone composition as in claim 1, wherein said epoxy-functional M group is $(CH_3)_2SiO_{\frac{1}{2}}-$

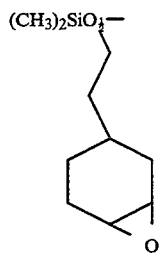

5. An ultraviolet radiation-curable epoxysilicone composition comprising a blend of epoxy-functional silicone resins and epoxy-stopped silicone fluids curable in the presence of an efficacious amount of photocatalyst and ultraviolet radiation, said blend comprising:

(A) about 60% by weight epoxy-functional silicone resin, said resin containing Q groups, epoxy-functional M groups and at least one member selected from D groups and T groups, wherein said resin comprises at least 5 parts of the sum of M groups and epoxy-functional M groups per 10 parts of the sum of Q groups, D groups and T groups;

(B) about 40% by weight epoxy-stopped silicone fluids containing epoxy-functional M groups; and said blend having an epoxy equivalent weight of greater than 1000.

6. An epoxysilicone composition as in claim 5, wherein said epoxy-functional M group is $(CH_3)_2SiO_{\frac{1}{2}}-$

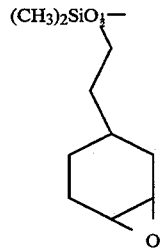

7. An ultraviolet radiation-curable epoxysilicone composition comprising a blend of epoxy-functional silicone resins and epoxy-stopped silicone fluids curable in the presence of an efficacious amount of photocatalyst and ultraviolet radiation, said blend comprising:

(A) from about 80 to about 20% by weight epoxy-functional silicone resin, said resin containing Q groups, epoxy-functional M groups and at least one member selected from D groups and T groups, wherein said resin comprises at least 5 parts of the sum of M groups and epoxy-functional M groups per 10 parts of the sum of Q groups, D groups and T groups;

(B) about 20 to about 80% by weight epoxy-stopped silicone fluids containing epoxy-functional M groups; and said blend having an epoxy equivalent weight of greater than 1000.

8. An epoxysilicone composition as in claim 7, wherein said epoxy-functional M group is $(CH_3)_2SiO_{\frac{1}{2}}-$

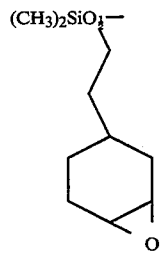

9. An epoxysilicone as in claim 7, wherein the photocatalyst is selected from iodonium and sulfonium salts.

10. An epoxysilicone as in claim 9, wherein the epoxy functional silica resin has the formula $M^E M_8 D_3 T_2 Q_5$ wherein $M^E$ comprises:

$(CH_3)_2SiO_{\frac{1}{2}}-$

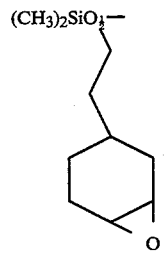

M comprises: $(CH_3)_3 SiO_{1/8}-$
D comprises: $(CH_3)_2 SiO-$
T comprises: $(CH_3) SiO_{3/2}-$ and
Q comprises: $SiO_{4/2}-$.

11. An epoxysilicone composition as in claim 7, wherein (B) has an EEW<8000.

12. An epoxysilicone composition as in claim 7, wherein (B) has an EEW ranging from about 500 to about 2500.

* * * * *